Nov. 28, 1933.  L. G. NICHOLSON  1,936,606
MOTOR VEHICLE
Filed Sept. 3, 1930  2 Sheets-Sheet 1

INVENTOR:
Leslie G. Nicholson

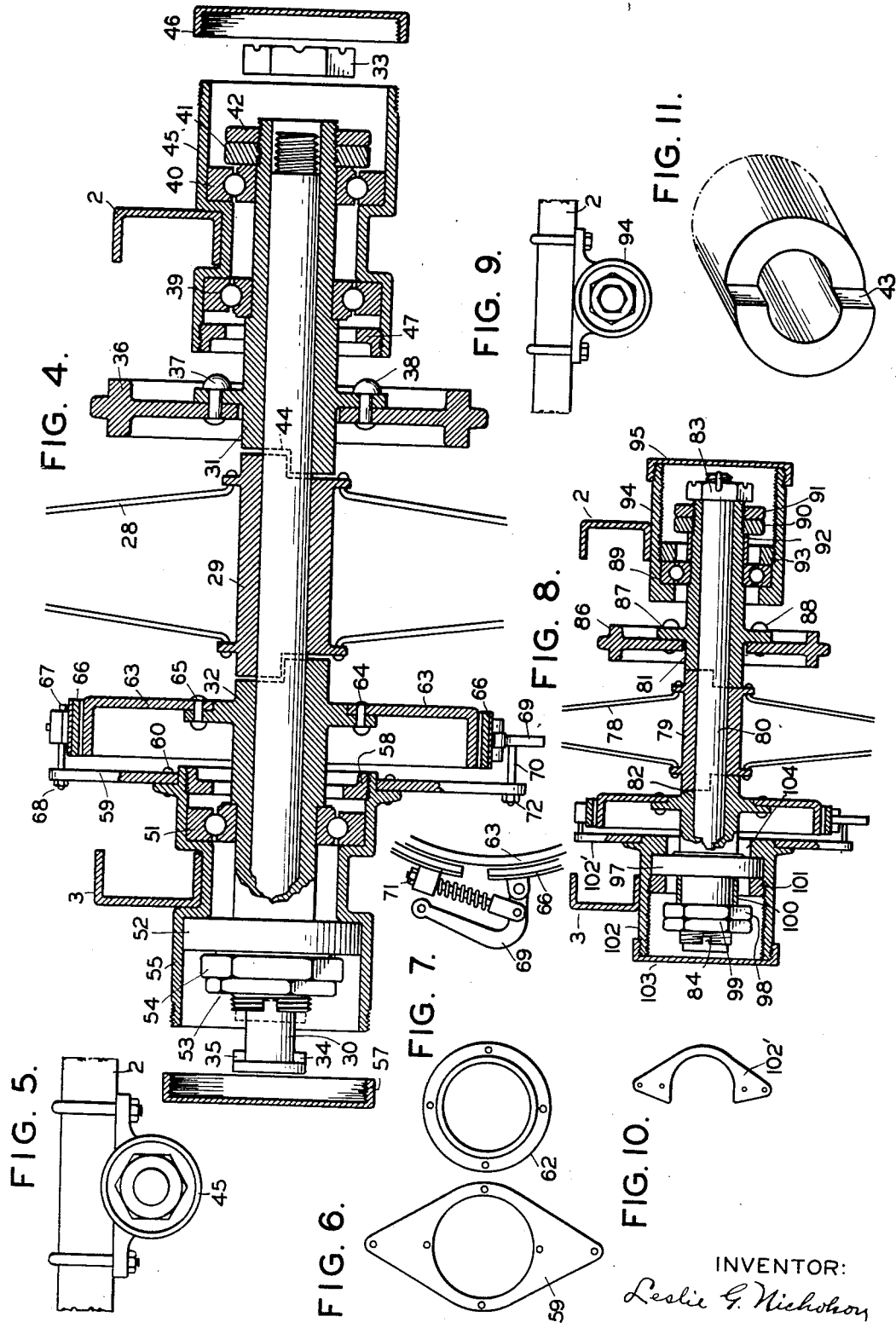

Patented Nov. 28, 1933

1,936,606

UNITED STATES PATENT OFFICE 1,936,606

MOTOR VEHICLE

Leslie G. Nicholson, St. Helena, Calif.

Application September 3, 1930. Serial No. 479,575

2 Claims. (Cl. 180—30)

My motor vehicle relates to improvements in motor vehicle wherein a body supported upon a single front and rear wheel arranged in tandem is provided with emergency wheels to enable it to stop and pass through traffic without requiring the driver to hold the vehicle up. The two side wheels are held out of contact with the ground when the car is in motion. Braking and sprocket chain driving mechanisms are secured to the rear of the frame having the driving wheel detachably mounted between the two said mechanisms.

The objects of my invention are:

First, to provide an improved two-wheeled motor vehicle having a detachable driving wheel.

Second, to provide an improved motor vehicle having a detachable driving wheel mounted between the braking and driving mechanisms. An endwise removable shaft bolt which extends centrally through the said mechanisms and the driving wheel hub which rotates with the tubular members in said mechanisms.

Third, to provide a two-wheeled motor vehicle having a long rigid frame which is provided with an upward vertical bend at the front, braking and sprocket chain driving mechanisms secured to the rear of the frame. A tubular member mounted in each said mechanism having a step-cut at the inner end thereof which engages the step-cuts in ends of driving wheel hub.

Fourth, to provide an improved way to connect the rear wheel of the motor vehicle to the frame so as to enable wheel to be easily detached whenever it is necessary to replace a new tire or make repairs.

Fifth, to provide an improved arrangement whereby the rear or driving wheel may be dismounted without disturbing the driving and braking mechanism.

Sixth, to provide a new brake improvement for motor vehicle having an external brake to be operated from braking mechanism at rear.

Seventh, to provide an oblong opening in the rear of body between the compartments, whereby the driving wheel may be lifted upward vertically through the oblong opening when detached from the braking and driving mechanisms.

Other objects of the invention will be apparent as the description proceeds. An accomplishment of the invention is shown in the accompanying drawings in which the same reference numeral is applied to the same portion throughout the several figures of the drawings.

Fig. 4 is a detailed cross view of the braking and driving mechanism, showing the driving wheel between the two mechanisms.

Fig. 5 is a side view taken from Fig. 4 showing frame member attached to the stationary frame seating means in the indentation at center of bearing housing.

Fig. 6 is a side view of brake support, the smaller figure being an end view of the inner end of bearing housing showing flange encircling housing to which brake support is attached.

Fig. 7 is a side view of brake lever which demonstrates the manner in which brake is applied.

Fig. 8 is a detailed view of the brake and driving mechanism showing shaft bolt secured in place, a single bearing means in each housing.

Fig. 9 is a side view taken from Fig. 8 showing the stationary frame seating means on the bearing housing.

Fig. 10 is a side view of brake support which may be used in Fig. 8.

Fig. 11 is a detailed view showing the step-cut which is used at the inner ends of tubular members and each end of driving wheel hub.

Figure 1:
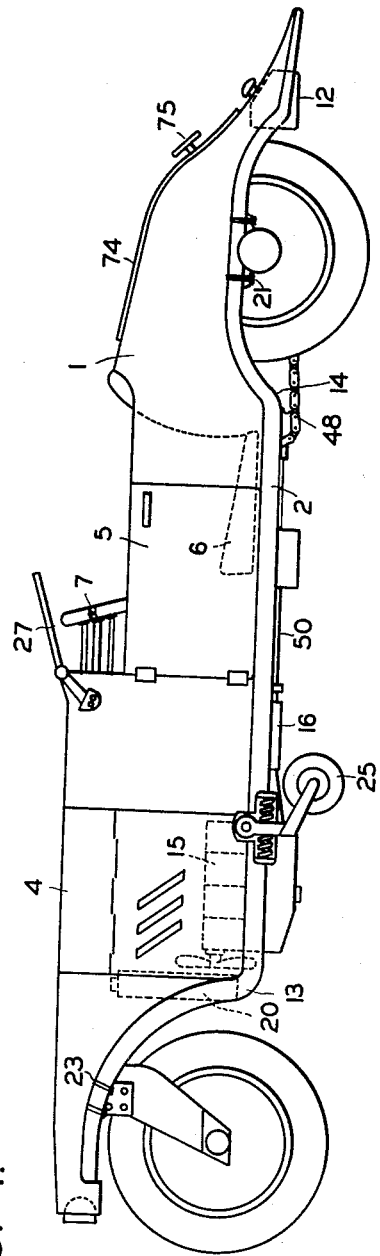
Fig. 1 is a vertical side view of my entire motor vehicle.

Referring to the drawings, the numeral 1 in Fig. 1 is used to designate in general a body mounted upon long frame members 2 and 3. The engine is covered with hood 4 to protect it from the weather. Hood 4 operates the same as the well known automobile hood. Door 5 has wide opening to seat 6. This body may have one or two doors which-ever is needed. Seat 6 is upholstered and made comfortable for ease in driving. The operator's handle bar 7 is placed the right distance from back of seat 6 and from long frame members 2 and 3 for ease and convenient driving.

Figure 3:
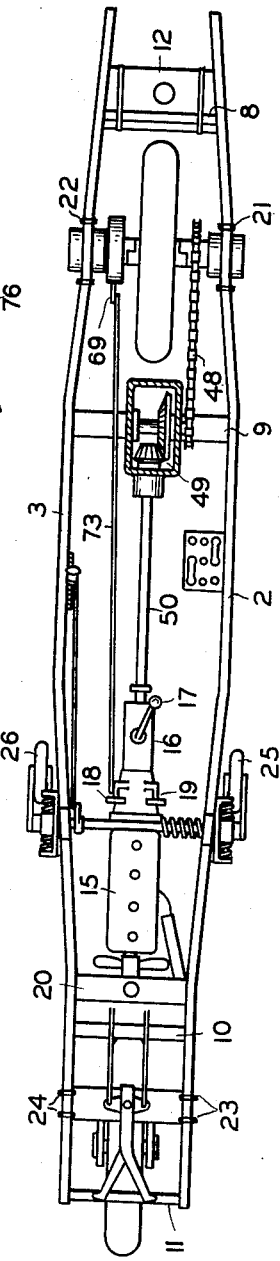
Fig. 3 is a plan view of the frame having body removed.

In Fig. 3 the vehicle frame consists of two long members 2 and 3 joined together with transverse bars or cross members 8, 9, 10 and 11 for holding the long frame members 2 and 3 rigid and in place. At the rear of the transverse bar 8 and between the long frame members 2 and 3 is a gas tank 12.

At front, the long frame members 2 and 3 have a vertical bend as indicated in Fig. 1 at 13 and extend horizontally rearward to 14, where there is a curved rise over braking and driving mechanisms. This brings the motor 15 and seat 6 lower to the ground. Motor is indicated at 15 in Figures 1 and 3 and the gear changing box at 16.

The gear change is affected by lever 17. The external brake pedal is shown at 18 and the clutch pedal at 19.

In Figures 1 and 3 radiator is shown at 20. The motor 15 is water cooled. Or it may be air cooled. Motor 15 is the one unit power plant.

The long frame members 2 and 3 are firmly clamped to driving mechanism at 21 and to braking mechanism at 22 as shown in Figures 1 and 3. The front ends of the long frame members 2 and 3 are firmly clamped to steering head at 23 and 24 as shown in Figures 1 and 3. The small side wheels 25 and 26 are to keep the motor vehicle from falling over when in traffic or when standing still. In Fig. 1 wind shield is shown at 27.

The rear wheel 28 is built on hub 29 as shown in Figures 3 and 4. Hub 29 has an opening through center to receive shaft 30. This shaft 30 passes entirely through hub 29 and through tubular sprocket gear mounting 31 and through tubular brake mounting 32. The adjusting nut 33 when in place rests against the outward end of member 31 and engages the threaded means on the end of the shaft bolt 30 and by tightening up nut 33 on shaft 30 they are interlocked together in a very secure manner with the bearing housing. Shaft 30 is smooth and round. At the head of shaft 30 there are two small stops 34 and 35 which fit notches in end of tubular brake mounting 32 to prevent shaft 30 from turning when nut 33 is being tightened or taken off.

The driving member consists of sprocket gear 36 as shown in Fig. 4 which is rotatably mounted to tubular sprocket gear mounting member 31 by means of bolts or rivets as shown at 37 and 38 and more places if needed. The tubular sprocket gear mounting member 31 is journaled at end and rotates in bearing members 39 and 40 which are held securely in position by adjusting lock nuts 41 and 42.

The tubular sprocket gear mounting member 31 and the rear wheel hub 29 are engaged in step-cut 43 as shown in Fig. 11 and as shown at 44 in Fig. 4 whereby tubular sprocket gear mounting member 31 will drive rear wheel 28. Bearing members 39 and 40 are enclosed in housing 45 on each side of indentation formed in said housing and in which frame member 2 is seated, and the tubular sprocket chain mounting member 31 extends through bearing members 39 and 40 and held in operative adjustment within the bearing housing 45 by adjusting nuts 41 and 42 on the outward end of member 31.

On the outward end of bearing housing 45 a dust cover 46 is threaded thereon and may be taken off very easily when it is necessary to remove nut 33 from shaft 30 or to make adjustments of bearing members 39 and 40. Grease stop 47 is threaded in housing 45. Long frame member 2 is seated in the indentation to the seating means on top of housing 45 as shown in Figs. 4 and 5 and is rigidly connected thereto. Long frame member 2 may be seated on bottom of housing 45 if it is necessary to bring frame lower to the ground.

In Fig. 3 sprocket chain 48 extends around sprocket gear 36 and around driving sprocket gear which is attached to the gear box forward of the driving wheel 28. The drive line 50 extends forwardly from the gear box 49 to the gear shifting box or the transmission 16.

The tubular brake mounting member 32 is journaled at end and rotates in bearing members 51 and 52 which are held securely in the adjusted position by means of adjusting nuts or locking nuts 53 and 54. The bearing members 51 and 52 are mounted in the bearing housing 55 on each side of the indentation which is in the center of housing 55. The tubular brake mounting member 32 is provided with the step-cut 43 as shown in Fig. 11 at the inner end thereof, and which is also shown at 56 in Fig. 4. On the outward end of the bearing housing 55 a dust cover 57 is threaded thereon, and may be removed which gives free accessibility to the shaft bolt 30 or for the removal shaft bolt 30. The removal of dust cover 57 also gives freedom to the locking nuts 53 and 54 which adjusts the bearing members 51 and 52 upon the tubular brake mounting member 32. The grease container 58 is threaded in the bearing housing 55 at the inner end thereof.

In Fig. 5 the frame seating means is built in the indentation of the bearing housing 45 and included as a member of housing 45, and extends longitudinally with the frame member 3 which is rigidly secured thereto. The frame seating means in the bearing housing 55 is constructed in the same manner as the frame seating means in the bearing housing 45.

In Fig. 4 the brake band support 59 is plainly shown mounted upon the inner end of the bearing housing 55 and securely riveted thereto at 60 and 61, however, there may be as many rivets applied as may be necessary to rigidly secure the brake support 59 thereon. In Fig. 6 is shown a side view of the brake support 59 which has a large central opening therethrough which slips over the inner end of the bearing housing 55 and rests against the flange which encircles the housing 55 and is secured thereto. The small figure at the side of the brake support presents an end view of the housing 55, and at 62 the flange is shown encircling the housing having a plurality of holes for securing the brake support 59 thereto.

In Fig. 3 the brake rod 73 is pivotally connected to the brake lever 69 and extends forwardly to the brake pedal 18. The relative positions of the braking and driving mechanisms are also shown attached to the rear of the frame, the driving wheel 28 being detachably mounted between the braking and driving mechanisms. The tubular members 31 and 32 in the braking and driving mechanisms are provided with step-cuts at the inner ends thereof which are adapted to engage the step-cuts in each end of hub 29 and are substantially interlocked together in the rear wheel hub by shaft bolt 30 extending horizontally through the central openings in the tubular brake mounting member 32, the hub 29, and the tubular sprocket gear mounting 31, which presses the said step-cuts at the inner ends of said tubular members 31 and 32 into firm engagement with the step-cuts in hub 29 by tightening the adjusting nut 33 on end of shaft bolt 30. The shaft bolt 30 when tightened rotates and functions concurrently with the tubular members 31 and 32 and the hub 29 when substantially pressed together.

Figure 2:
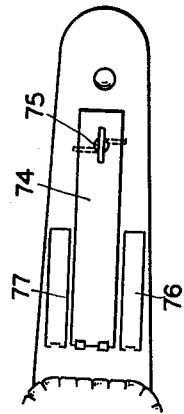
Fig. 2 is a sectional top view of body showing the detachable fender enclosing driving wheel.

*Fig. 4.*—When it is required that the driving wheel 28 be removed from the braking and driving mechanisms the nut 33 is removed from the end of shaft bolt 30 and shaft bolt 30 removes endwise completely from the tubular members 31 and 32 and the hub 29. The removal of shaft bolt 30 disengages the hub 29 from the tubular members 31 and 32 permitting an upward vertical removal of the driving wheel 28 through the oblong opening in the rear of the body, when the fender 74 enclosing the oblong opening and the driving wheel 28 has been removed from the rear of the body. The removal of fender 74 is shown in Fig. 2. The removal of the driving wheel 28 from the braking and driving mechanisms does not interfere with or disarrange the mechanisms for they are substantially secured to the frame members 2 and 3 and remain firm in place.

In Fig. 1 side view of fender 74 is shown. In Fig. 2 rear wheel fender 74 is removed or fastened down to body by turning catch 75. Rear wheel 28 can be special wire wheel or an automobile wooden wheel. In Fig. 2 at each side of rear wheel fender 74 are two storage compartments with covers 76 and 77.

In Fig. 8 is shown the single bearing. It operates just the same as the double bearings in Fig. 4. Bearings in Fig. 4 or Fig. 8 can be taper roller bearings or ball bearings. In Fig. 8 rear wheel 78 is built on hub 79. Hub 79 has an opening through center to receive shaft 80. This shaft 80 passes entirely through hub 79 and through tubular sprocket gear mounting 81 and through tubular brake mounting 82. Nut 83 fits on end of shaft 80 and by tightening up on nut 83 on shaft 80 they are locked together in a very secure manner. Shaft 80 is smooth and round. At the head of shaft 80 there are two small stops 84 which fit notches in end of tubular brake mounting 82 to prevent shaft 80 from turning when nut 83 is being tightened or taken off.

The driving member consists of sprocket gear 86 which is held securely to the tubular sprocket gear mounting 81 by means of bolts or rivets as shown at 87 and 88. The tubular sprocket gear mounting 81 is journaled at end and rotates in bearing member 89 which is held securely in position by lock nuts 90 and 91. Between bearing member 89 and lock nut 90 there is a spacer 92. This spacer 92 makes room for grease stop 93 between bearing 89 and lock nut 90. Grease stop 93 is threaded inside of housing 94 and when grease stop 93 is set up tight against bearing member 89 it holds the same firm in place. Dust cap 95 threads on or off of housing 94. At the end of housing 94 is shown grease stop 96.

The tubular brake mounting 82 is journaled at end and rotates in bearing 97 which is held securely in position by lock nuts 98 and 99. Between bearing member 97 and lock nut 98 there is a spacer 100. This spacer 100 makes room for grease stop 101 between bearing member 97 and lock nut 98. Grease stop 101 is threaded inside of housing 102 and when grease stop 101 is set up tight against bearing 97 it holds the same firm in place. Dust cap 103 threads on or off of housing 102. At the end of housing 102 is shown grease container 104.

Brake drum and brake support are mounted and operated the same as described in Fig. 4. If long frame member 3 should crowd brake support on top of housing 102 brake support as shown in Fig. 10 can be used. The long frame members 2 and 3 are seated on top of housing 94 and housing 102 as shown in Fig. 9. The frame seat is built solid to housing 94 and housing 102. The driving mechanism and the braking mechanism and the rear wheel hub fit together in step-cut as shown in Fig. 11. When nut 83 is tightened up on shaft 80 they are held securely in place. Rear wheel is removed the same as described in Fig. 4.

What I claim as my invention is:

1. A motor vehicle comprising in combination, a long rigid frame of substantial width throughout its length, a body mounted thereon supported at the front by a steering wheel and at rear by a driving wheel, braking means and sprocket chain driving mechanism attached to the rear of the frame, said driving wheel being mounted between said braking and driving means, a tubular member included in said driving means, a step-cut at the inner end of said tubular member, a sprocket gear mounted thereon for rotating said tubular member, a bearing housing having an indentation at the center thereof forming a frame seating means extending longitudinally with the frame, a bearing member mounted in each end of the bearing housing on each side of the indentation, and operatively adjusted on said tubular member within the bearing housing by adjustment means on the outward end of said tubular member, a grease container at inner end of said bearing housing, a dust cover thereon at the outward end, a driving sprocket chain arranged in horizontal alignment with the said driving means, and the gear box forward of said driving wheel, encircling said sprocket gear in the driving means and the gear box sprocket gear, said braking and driving means are substantially journaled to said driving wheel hub and said frame by means of a shaft bolt extending through said brake, driving means and said hub.

2. A motor vehicle comprising in combination, a long rigid frame of substantial width throughout its length, a body mounted thereon supported at the front by a steering wheel and at the rear by a driving wheel, braking means and sprocket chain driving mechanism attached to the rear of the frame, said driving wheel being detachably mounted between said braking and driving means, a tubular member included in said driving means, another tubular member included in said braking means, step-cuts at the inner ends of said tubular members which engage with step-cuts of the same type in each end of said hub, a brake drum mounted on said brake tubular member and rotating therewith, a bearing housing mounting on the outer end of each tubular member and having an indentation at the center thereof forming a frame seating means extending longitudinally with the frame, a bearing member mounted in each end of each said bearing housing on each side of the indentation, and operatively adjusted on said tubular member within the bearing housing by provided adjustment means on the outward end of said tubular member, a brake band support mounted on said bearing housing at the inner end, a grease container within the bearing housing at the inner end, a dust cover thereon at the outward end, and a shaft bolt extending through said brake, driving means and said hub, and interlocking the said brake and driving means with said hub, by a nut on end of said shaft bolt.

LESLIE G. NICHOLSON.